US009976002B2

(12) United States Patent
Prince

(10) Patent No.: US 9,976,002 B2
(45) Date of Patent: *May 22, 2018

(54) METHOD TO HEURISTICALLY CONTROL FORMATION AND PROPERTIES OF A COMPOSITION

(75) Inventor: Jack Raymond Prince, West Bountiful, UT (US)

(73) Assignee: REVOLUTIONARY PLASTICS, LLC, Las Vegas, NV (US)

( * ) Notice: Subject to any disclaimer, the term of this patent is extended or adjusted under 35 U.S.C. 154(b) by 805 days.

This patent is subject to a terminal disclaimer.

(21) Appl. No.: 14/123,052

(22) PCT Filed: May 25, 2012

(86) PCT No.: PCT/US2012/039697
§ 371 (c)(1),
(2), (4) Date: May 30, 2014

(87) PCT Pub. No.: WO2012/166651
PCT Pub. Date: Dec. 6, 2012

(65) Prior Publication Data
US 2014/0303282 A1 Oct. 9, 2014

Related U.S. Application Data

(60) Provisional application No. 61/491,091, filed on May 27, 2011.

(51) Int. Cl.
*C08J 3/22* (2006.01)
(52) U.S. Cl.
CPC ............. *C08J 3/22* (2013.01); *C08J 3/226* (2013.01); *C08J 2300/00* (2013.01)
(58) Field of Classification Search
CPC .... C08J 3/22; C08J 3/226; C08K 3/34; C08K 2003/2206; C08K 2003/2227
USPC .................. 523/351; 524/442, 444
See application file for complete search history.

(56) References Cited

U.S. PATENT DOCUMENTS

| | | | |
|---|---|---|---|
| 3,981,840 A | 9/1976 | Yamamoto et al. | 260/42 |
| 4,013,616 A | 3/1977 | Wallace | 260/42.46 |
| 4,198,327 A | 4/1980 | Matsumoto et al. | 260/4 |
| 4,243,575 A | 1/1981 | Myers et al. | 260/37 PC |
| 4,661,533 A | 4/1987 | Stobby | 521/122 |
| 4,898,620 A | 2/1990 | Rayfield et al. | 106/464 |
| 5,071,891 A | 12/1991 | Harrison et al. | 523/209 |
| 5,158,725 A | 10/1992 | Iianda et al. | 264/40.7 |
| 5,177,139 A | 1/1993 | Klaar et al. | 524/484 |
| 5,296,420 A | 3/1994 | Garvie | 501/105 |
| 5,302,634 A | 4/1994 | Mushovic | 523/219 |
| 5,369,147 A | 11/1994 | Mushovic | 523/219 |
| 5,508,315 A | 4/1996 | Mushovic | 521/122 |
| 5,552,455 A | 9/1996 | Schuler et al. | 523/137 |
| 5,604,266 A | 2/1997 | Mushovic | 521/122 |
| 5,639,531 A | 6/1997 | Chen et al. | 428/49 |
| 5,851,469 A | 12/1998 | Muller et al. | 264/177.1 |
| 5,886,078 A | 3/1999 | Sullivan et al. | 524/449 |
| 6,110,855 A | 8/2000 | Moorhead et al. | 501/127 |
| 6,153,670 A | 11/2000 | Skelhorn | 523/210 |
| 6,242,098 B1 | 6/2001 | Styron et al. | 428/402 |
| 6,269,952 B1 | 8/2001 | Watt et al. | 209/3 |
| 6,362,252 B1 | 3/2002 | Prutkin | 523/200 |
| 6,379,797 B1 | 4/2002 | Nikkeshi et al. | 428/403 |
| 6,391,082 B1 | 5/2002 | Holl | 75/230 |
| 6,583,217 B1 | 6/2003 | Li et al. | 524/650 |
| 6,669,773 B2 | 12/2003 | Malloy et al. | 106/705 |
| 6,695,902 B2 | 2/2004 | Hemmings et al. | 106/284.05 |
| 6,767,399 B2 | 7/2004 | Peev et al. | 106/808 |
| 6,831,118 B2 | 12/2004 | Münzenberger | 523/218 |
| 6,916,863 B2 | 6/2005 | Hemmings et al. | 523/218 |
| 6,995,202 B2 | 2/2006 | Lake, Jr. et al. | 524/285 |
| 7,241,818 B2 | 7/2007 | Hemmings et al. | 523/218 |
| 7,691,350 B2 | 4/2010 | Hill et al. | 423/235 |
| 7,879,939 B2 | 2/2011 | Prince et al. | 524/442 |
| 8,106,105 B2 | 1/2012 | Cernohous | 521/83 |

(Continued)

FOREIGN PATENT DOCUMENTS

| | | | |
|---|---|---|---|
| AU | 2003 235 021 | 3/2004 | ............. C08K 3/36 |
| CN | 1894322 | 1/2007 | ............. C08J 3/22 |

(Continued)

OTHER PUBLICATIONS

PCT Intl Search Report and Written Opinion dated Dec. 28, 2012, issued in PCT/US2012/039697 (15 pgs).
Barnes et al., "Ash Utilisation from Coal-Based Power Plants" (30 pgs) (Date Unknown).
RockTron Technology Overview Presentation Slides, IGEM 2010, (78 pgs) (Date Unknown).
Chinese Office Action issued in related application No. 201180037024.9, dated Nov. 18, 2013 (4 pgs).
European Search Report issued in related application No. 11827112.1, dated Nov. 7, 2013 (7 pgs).
PCT International Preliminary Report on Patentability issued in related application No. PCT/US2012/039697, dated Dec. 12, 2013 (7 pgs).

(Continued)

*Primary Examiner* — Edward J Cain
(74) *Attorney, Agent, or Firm* — Hayes Soloway P.C.

(57) ABSTRACT

One or more fly ash materials having a particle size distribution that may include cinders of selected sizes that is heuristically determined to be suitable to form a blend that is mixed with a resin to form a master batch pellet, powder or liquid; Or a fully compounded pellet, powder to liquid. The master batch pellet, powder or liquid; Or a fully compounded pellet, powder or liquid is later mixed with more resin which is manufactured by a process to produce a finished product. The process has parameters that may be measured and the finished product has physical properties that can be determined by testing which parameters and properties can be controlled by the heuristic selection of the one or more fly ash materials and optionally the heuristic selection of one or more other materials to be included in the formation of the blend.

19 Claims, 1 Drawing Sheet

(56) References Cited

U.S. PATENT DOCUMENTS

| | | | |
|---|---|---|---|
| 8,419,405 B2 | 4/2013 | Prince et al. | 425/148 |
| 8,563,629 B2 * | 10/2013 | Prince | B29B 7/16 523/351 |
| 9,175,156 B2 | 11/2015 | Prince et al. | 524/493 |
| 2002/0016224 A1 | 2/2002 | Pasqua, Jr. et al. | 473/376 |
| 2002/0040084 A1 | 4/2002 | Colmar et al. | 524/430 |
| 2002/0124775 A1 | 9/2002 | Hemmings et al. | 106/273.1 |
| 2002/0157799 A1 | 10/2002 | Sachs et al. | 164/4.1 |
| 2003/0032707 A1 | 2/2003 | Hemmings et al. | 524/425 |
| 2003/0083156 A1 | 5/2003 | Pasqua, Jr. et al. | 473/376 |
| 2003/0092816 A1 | 5/2003 | Mehta et al. | 524/445 |
| 2003/0167973 A1 | 9/2003 | Peev et al. | 106/802 |
| 2004/0144287 A1 | 7/2004 | Tardif et al. | 106/705 |
| 2004/0266933 A1 | 12/2004 | Friedman et al. | 524/442 |
| 2005/0163969 A1 | 7/2005 | Wade | 428/151 |
| 2006/0020067 A1 | 1/2006 | Brant et al. | 524/236 |
| 2006/0058427 A1 | 3/2006 | O'Neill et al. | 523/319 |
| 2006/0276088 A1 | 12/2006 | DeWesse | 442/59 |
| 2008/0029925 A1 | 2/2008 | Brown | 264/166 |
| 2008/0114112 A1 | 5/2008 | Hemmings et al. | 524/425 |
| 2008/0119578 A1 | 5/2008 | Prince et al. | 521/91 |
| 2008/0131344 A1 | 6/2008 | Hill et al. | 423/238 |
| 2008/0269361 A1 * | 10/2008 | Soyama | A61K 38/215 521/28 |
| 2008/0306198 A1 | 12/2008 | Zucchelli et al. | 524/394 |
| 2009/0087509 A1 | 4/2009 | Linares | 425/130 |
| 2009/0130443 A1 | 5/2009 | Lustiger | 428/401 |
| 2010/0016459 A1 | 1/2010 | Cernohous | 521/146 |
| 2010/0119751 A1 | 5/2010 | Lanier | 428/36.9 |
| 2010/0256281 A1 | 10/2010 | Palama | 524/473 |
| 2011/0071252 A1 | 3/2011 | Prince et al. | 524/567 |
| 2011/0130501 A1 | 6/2011 | Prince et al. | 521/147 |
| 2011/0144243 A1 | 6/2011 | Prince et al. | 524/65 |
| 2011/0178198 A1 | 7/2011 | Backer et al. | 521/149 |

FOREIGN PATENT DOCUMENTS

| | | | |
|---|---|---|---|
| CN | 101189292 | 5/2008 | C08K 3/34 |
| EP | 0640650 | 3/1995 | C08L 23/16 |
| GB | 2478696 | 9/2011 | B60C 1/00 |
| JP | 2000-226473 | 5/2000 | C08K 9/04 |
| JP | 2001261921 | 9/2001 | B65D 65/02 |
| JP | 2001302809 | 10/2001 | C08J 11/04 |
| JP | 2005-068305 | 3/2005 | C08L 101/00 |
| WO | WO 99/34973 | 7/1999 | B32B 5/16 |
| WO | WO9937592 | 7/1999 | C04B 14/00 |
| WO | WO2008005143 | 1/2008 | C08J 3/22 |
| WO | WO2009136185 | 11/2009 | C08K 3/00 |
| WO | WO2011037865 | 3/2011 | C04B 14/00 |
| WO | WO2013082024 | 6/2013 | C08L 101/00 |

OTHER PUBLICATIONS

Office Action issued in U.S. Appl. No. 14/344,043, dated Jan. 15, 2015, 14 pgs.

Office Action issued in U.S. Appl. No. 14/002,629, dated Mar. 18, 2015, 17 pgs.

Office Action issued in U.S. Appl. No. 14/002,629 dated Sep. 17, 2015.

Notice of Allowance issued in U.S. Appl. No. 14/344,043 dated Jun. 30, 2015.

Notice of Allowance issued in U.S. Appl. No. 14/002,629 dated Nov. 19, 2015.

Brandup et al., Polymer Handbook, 4$^{th}$ edition, John Wiley & Sons, 1999, p. V/16.

"Wanted Waste: Fly Ash", Chemistry & Industry (London, United Kingdom), Mar. 8, 2010, pp. 24-26.

Deepthi, et al. "Mechanical and thermal characteristics of high density polyethylene-fly ash Cenospheres composites", Material and Design, vol. 31, pp. 2051-2060 (2010).

GRT-Pozzolans, Material Safety Data Sheet of Class C fly ash, Jan. 8, 2014.

Huang et al., "Processed Low NOx Fly Ash as a Filler in Plastics", Journal of Minerals & Materials Characterization & Engineering, vol. 2, No. 1, pp. 11-31, 2003.

A. Brent Strong, "Plastics Materials and Processing", Third Edition, (21 pgs), 3rd Edition, Copyright 2006.

A. Brent Strong, "Fundamentals of Composites Manufacturing Materials, Methods, and Applications", Second Edition, (4 pgs) 2nd Edition, Copyright 1996.

Berghahn, M., "Smart fly ash solutions," Evonik Industries, Science-to-Business Center Eco$^2$, Eurocoalash May 28, 2010 (20 pgs).

Chinese Office Action and translation submitted by the State Intellectual Property Office in application No. 200680015398.X, dated Apr. 15, 2010 (12 pgs).

Extended European Search Report issued in EP Appln. No. 10 819 302.0 dated Sep. 14, 2016, 12 pgs.

Notice of Allowance issued in U.S. Appl. No. 14/360,556 dated Nov. 28, 2016 (8 pgs).

Office Action issued in U.S. Appl. No. 14/360,556 dated Sep. 22, 2015 (25 pgs).

Office Action issued in U.S. Appl. No. 14/360,556 dated Jul. 13, 2016, (31 pgs).

Office Action issued in CA 2,810,158 dated Jul. 11, 2016 (3 pgs).

RockTron Technology Overview, IGEM 2010 (Part 1—20 pgs).

RockTron Technology Overview, IGEM 2010 (Part 2—20 pgs).

RockTron Technology Overview, IGEM 2010 (Part 3—20 pgs).

RockTron Technology Overview, IGEM 2010 (Part 4—18 pgs).

Rohatgi et al., "Compressive and ultrasonic properties of polyester/fly ash composites", J Mater Sci (2009) 44:1485-1493.

Schut, "Fly-Ash Fille Stages a Comeback" Article, Plastics Technology, Sep. 1999 Issue (2 pgs).

Srivastava et al., "Tensile and fracture properties of epoxy resin filled with flyash particles", Journal of Materials Science 25 (1990) 3513.

Wong & Truss "Effect of Flyash Content and Coupling Agent on the Mechanical Properties of Flyash-Filled Polypropylene", Composites Science and Technology 52 (1994), 361-368.

* cited by examiner

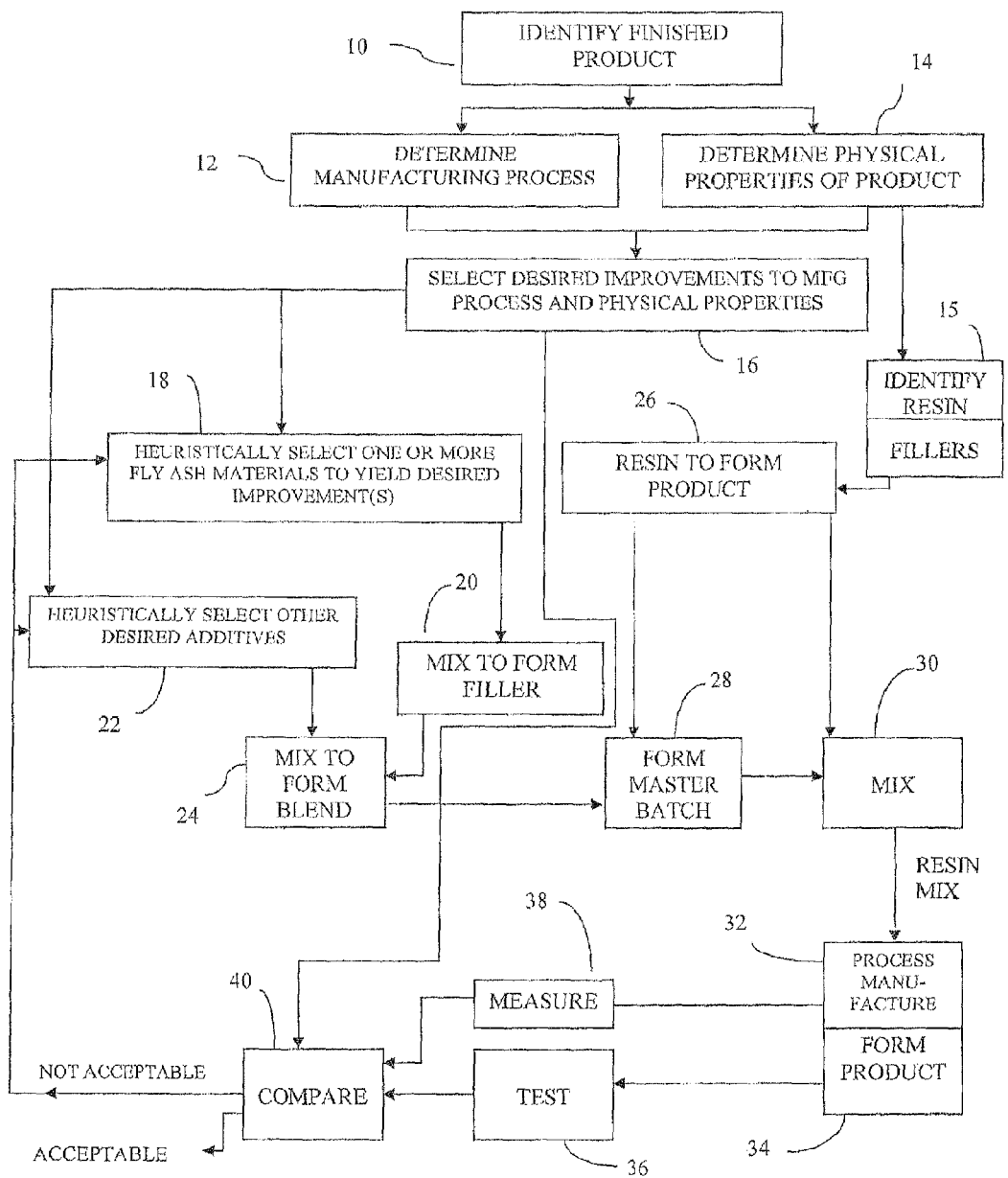

US 9,976,002 B2

METHOD TO HEURISTICALLY CONTROL FORMATION AND PROPERTIES OF A COMPOSITION

CROSS REFERENCE TO RELATED APPLICATIONS

This application claims priority from U.S. Provisional Application Ser. No. 61/491,091 filed May 27, 2011 through PCT/US12/39697 filed May 25, 2012.

BACKGROUND OF THE INVENTION

1. The Field of the Invention

This invention relates to a method for heuristically controlling the formation of a composition of matter by heuristically selecting a filler to attain desired manufacturing parameters and physical properties of the resulting composition of matter and more particularly to a system and method for forming a plastic composition or composite using one or more heuristically selected fly ash materials as a filler to attain desired processing parameters and desired physical properties.

2. The Relevant Technology

A resin is typically selected for desired physical properties which can be controlled using additives that include colorants, lubricants and stabilizers. In addition, foaming agents may be used along with various fillers all to modify the physical properties or characteristics of the resulting material when it is cured or hardened. For example, it is known that low cost fillers like clay, ground limestone, talc and other powered or granulated materials can be added to a resin (in its liquid state) to reduce the cost of the material to produce a given product because less resin is being used, A. Brent Strong, *PLASTICS Materials and Processing*, (3$^{rd}$ Ed. Pearson Prentice Hall 2006), pp 1-21.

Traditionally, fillers have been used to lower the cost of materials because expensive resin is being replaced by less expensive filler. But fillers can also be used to impact on the physical structural characteristics of the resulting product. For example, glass beads can be added in certain quantities to regulate the structural characteristics of a finished plastic product. Other fillers that have an aspect ratio (length divided by width or diameter) are used to impact the physical properties of the resulting composite or composition, M. Xanthos, *Functional Fillers For Plastics* (Wiley-VCH 2005) pp. 8-10.

Fillers are also known to have some impact on processing characteristics of a melt. For example, unfilled polymers behave like non-newtonian fluids with viscosity changing during melt processing. Additives impact on the rheology except that increasing the amount of the filler (regardless of the shape of the particles of the filler) leads to reduced melt elasticity. That is, the melt thickens and, in turn, the viscosity increases. M. Xanthos, *Functional Fillers For Plastics* (Wiley—VCH 2005) pp. 32-35.

Widespread use of fillers over time has led to classification of different types of fillers along with fillers that have known benefits or functions. M. Xanthos, *Functional Fillers For Plastics* (Wiley—VCH 2005) pp. 12-15. While the selection, function and use of many different kinds of fillers is known, the process of selecting a filler is largely empirical. Further, the quality of certain fillers is understood to vary with, among other factors, the source. Thus many materials that would be suitable, or even ideal fillers, are not used because the quality is inconsistent not only from one source to another source, but also between batches and even within some batches. As a result, such materials have not been used or selected notwithstanding their lower cost and availability.

A system for forming a composition with an optimized filler or combination of fillers is disclosed in US patent application that has now issued as U.S. Pat. No. 8,419,405 on 16 Apr. 2013 (the '405 Patent). The '405 Patent also discloses the use of fly ash and combinations of fly ash which are formulaically processed or blended to make a uniform filler with consistent physical attributes particularly for use in resins such as plastics. The process can be slow or unavailable because equipment to sift, and/or analyze and/or meter may not be available. Thus there is a need for a method to heuristically process to obtain results comparable to or that approach those obtained using the system and methods disclosed in the '405 Patent.

Fly ash, cinders and combinations of fly ash and cinders have also been Identified as fillers that can be used with resins in a beneficial manner as disclosed in U.S. Pat. No. 7,879,939 (Prince et al.) which is incorporated by reference as if fully set forth herein.

Stated most generally, fly ash is a mineral formed during coal combustion. As the coal is burned, a residue or "ash" is formed that is very light so that it flies or moves in a stream with other combustion gases up the exhaust (e.g., chimney). It is typically extracted from the stream and stored nearby as a residue. Cinders are also formed during coal combustion and are typically made from fused or vitrified matter but also may include other material that was in the coal. Large cinders typically fall to bottom in the combustion zone or area. Some smaller or lighter cinders become entrained in the stream along with fly ash.

Fly ash as well as the cinders varies in chemical and physical make up based on, among other things, the specific source of the coal and the combustion process. In turn, fly ash varies in physical make up from source to source (e.g., electrical power plant) and even within a given source as combustion processes and raw materials are varied. In turn, fly ash with cinders has not been a suitable filler because its physical and chemical make up is not standard or consistent.

BRIEF SUMMARY OF THE INVENTION

A method of heuristically controlling the formation of and the properties of a composition involves a number of steps. First, the finished product that is formed from a composition is identified. The manufacturing process for the said finished product is determined. The process preferably has at least one measurable parameter (e.g., temperature of the composition, cycle time). Before, after, or at the same time, at least one physical property of said finished product is determined. Before, after, or at the same time that one is determining one physical property and the manufacturing process, the resin or the composition in use is determined. Thereafter, the same or different resin is identified that is to be used to manufacture the finished product.

Next, at least one desired improvement to one of said one measurable parameter of said manufacturing process and said physical property of said finished product is identified. Thereafter, one heuristically selects one or more first fly ash materials for the purpose of producing the one desired improvement or improvements. The fly ash or plurality of fly ash materials are then mixed with a portion of the resin to form a first master batch. The master batch may be in the form of pellets, a powder or a liquid. Alternately, one may mix the one or more first fly ash materials with all the resin to form a compound that is used to manufacture the desired product. The compound may also be formed into pellets or a powder or a liquid.

The first master batch is then mixed with another portion of the resin to form a first composition which is used to manufacture a first finished product using the identified manufacturing process having at least one measurable parameter. During the manufacture, the one measurable parameter is measured. After the product is manufactured, it is then tested to determine the one physical property.

The one measurable parameter that was measured and the one physical property from testing is then compared with the one desired improvement to determine if there is any difference. The difference is then evaluated to determine if the difference is acceptable or not acceptable. If the difference is acceptable, the composition can then be utilized in normal or full production to realize the benefits of the desired improvements. For a "not-acceptable-difference," a quantity of fly ash as well as the particular fly ash mixture to be used is heuristically varied to produce a different composition. That is, one heuristically selects a second one or more fly ash material(s) and/or varies the amount that is used and/or adds other materials (additives like titanium dioxide and calcium carbonate) to form a second master batch that is mixed with the resin to from a second composition. The master batch may be formed in a suitable way to be one of pellets, a powder or a liquid, or a combination of two or more of pellets and powder and liquid. Alternately, one may mix the one or more first fly ash materials with all the resin to form a compound that is used to manufacture the desired product. The compound may be in the form of two or more of pellets and powder and liquid. Of course, for a "not-acceptable-difference," one may vary the quantities and the mixture in various ways to attain better and even optimal results based on onus experience.

The steps may be repeated as necessary until the differences, if any are acceptable and the benefits desired have been substantially realized.

BRIEF DESCRIPTION OF THE DRAWINGS

To further clarify the above and other advantages and features of the present invention, a more particular description of the invention will be rendered by reference to the appended drawings. It should be understood that the drawing depicts only a typical embodiment of the invention and therefore is not to be considered limiting of the scope of the appended claims. More specifically:

FIG. 1 is a diagram of the heuristic method of the present invention.

DESCRIPTION

As noted in US Patent Application US 2011/0071252 that published on Mar. 24, 2011, fly ash can be processed and mixed in particular ways to produce a consistent filler for use with various or selected resins to produce benefits not expected. Fly ash can be selected from different sources and mixed in suitable quantities as needed to produce a suitable mixture to approximate a fly ash that empirically has been found to produce suitable or desired results. Preferred mixtures may include some cinders.

Preferred grades of fly ash and/or cinders typically have a melting point or greater than about 1090° C. and a specific gravity of from about 2.2 to about 2.8. The material is often referred to as "fly ash" even though it contains cinders and also other contaminants such as small amounts of heavy metals such as lead, mercury or cadmium. Preferably, the moisture content of the fly ash and/or cinders is less than 2% by weight and more preferably less than 1% by weight. The fly ash also has unburned carbon (LOI) and, in turn, has a polycyclic aromatic hydrocarbon content of less than about 200 parts per million.

As stated, fly ash may contain some cinders. So while cinders are indeed separate, it is not unusual to refer to fly ash with cinders as "fly ash." Applicant will here endeavor to refer to cinders separately and fly ash separately. The cinders entrained with or in the fly ash are typically quite small and are not of the type that fall to the bottom of the combustion area (large cinders). If the larger cinders are mixed into fly ash that is recovered from the exhaust stream, the larger cinders can be separated by sifting or filtering to produce fly ash that is useful but which still has some smaller cinders (e.g., less than about 1000 nm (microns) in effective diameter) and which has a particle size distribution that varies widely from source to source. Fly ash can also be demagnetized to remove magnetic particles that may include black particles.

Fly ash when prepared or dried and ready for use as a filler looks like a powder or flour. If and when one processes the fly ash through a particle size analyzer, one can determine the particle size distribution and determine in effect what size and kind of cinders are included in that "fly ash." Over time, one can pick up a handful of many different types or kinds of fly ash each of which has been analyzed. Upon picking up a handful, one can rub it between one's two hands. In that process, one will feel what can be referred to as grit or grains that are small cinders. Comparing one fly ash with cinders to another becomes possible to the experienced operator because the grit content or grain content (quantity of cinders), if any, will vary from one source or batch to another. Having worked with materials that have been analyzed to determine the particle size distribution, one can estimate the particle size distribution from the grit content determined by rubbing some of the fly ash between one's hands. And one can also estimate the particle size distribution without actually measuring the particle size distribution.

Alternately, one may evaluate a quantity of fly ash by putting it in a plastic bag. One can move the fly ash between ones hands and/or fingers in the plastic bag. This is a cleaner process than physically touching the fly ash.

In a preferred method, the user may take a sample and subject it to a controlled stream of moving air to observe the amount of dust generated and, in turn, allow the user to estimate the quantity of fines or dust in the material under consideration. Alternately, one can put a quantity in a plastic bag, or bottle and shake it for a period of time (e.g., 5 minutes). Thereafter, one looks into the bag or bottle with the cap off or the bag open to observe the fines or dust floating on top. In yet another alternate, one may pour, dump or otherwise empty a quantity of fly ash into a container like a bottle or a transparent bag in a consistent manner to observe the density or intensity of the fines floating or airborne when you shake. Indeed just about any process that will allow the user to consistently evaluate the fly ash and determine the fines and, in turn, estimate the particle size distribution is within contemplation.

The object is to introduce a selected fly ash with cinders into a selected resin (e.g., a polyurethane) in a quantity to produce consistent and desired results not only in the manufacturing process but also in the finished product. To avoid expensive processing using analyzers, one may proceed heuristically because some products have a cost profile that permits one or compels one to develop a product and/or improve the process quickly and economically. That is, the manufacturing process may be impacted by making the resins being processed, for example, less viscous with lower rheology thus using less energy to pump the resin into a tool in an injection molder or through an extruder. Alternately or at the same time, the quantity of fly ash and/or cinders included may be increased significantly so that the resin has better heat transfer characteristics so that the finished material or product cools faster reducing cycle time and reducing the amount of energy to heat and the amount of cooling and/or coolant to effect cooling. On the other hand, cinders can be abrasive leading to increased wear on the involved machines. In turn, the cinders also need to be controlled to regulate tool and machine wear.

In a similar fashion, the mechanical and structural properties of the finished product can be varied or controlled to some extent with the filler in combination with a particular resin. For example, the tensile strength, flexible modulus, impact, tear strength, brittleness, color, and even finish can be controlled to some degree by controlling the filler and more particularly the fly ash and cinder content of the material used to form the finished product. With experimentation or testing, one can develop an understanding how to vary the fly ash and cinder content to vary the different mechanical properties.

It can also be observed that fly ash, cinders and fly ash with cinders each have different colors. Some are lighter (towards white) and others are darker (towards black). That is, that one looks at a samples of fly ash with and without cinders from different sources and notes that each has a different color. The hues can be measured using various color index charts like the Munsel Color chart. The color of the filler like fly ash impacts on the color of the ultimate finished product. In turn, one can learn to select a fly ash to produce a desired color for the finished product. Also one can learn to select a fly ash and add selected quantities of a colorant (like titanium dioxide) to yield a finished product of a desired color.

In selected extrusion processes, the extruder has various zones in which the resin is processed from pellets to a melt which can be foamed and then extruded. The resin can be a mixture that includes fly ash and cinders in selected quantities to impact on the extrusion process and the extruded product. That is, the fly ash selected and the cinders selected can control viscosity, rheology, foaming and heating and cooling as well as the melt index leading to reduced energy consumption while controlling the mechanical properties of the extruded materials. Again, experience and experimentation allows the user to estimate or select fly ash and cinders to approximate or approach the results obtained using more specific processes like those disclosed in the '252 application.

FIG. 1 depicts a heuristic method to manufacture a selected finished product. Typically, one first identifies a finished product 10 such as a trash can, a waste paper basket, a milk crate, a storage container, toy shovels, or any one of a wide variety of products that typically referred to as plastic products that are made from and using resins. Once a product is identified, one can determine how it is made. That is, one can investigate to determine the manufacturing process 12 by which it is made by a particular manufacturer. Different manufacturers may use the same or different processes to form virtually identical products. As part of the investigation, one may learn the identity of the type of resin 15 and fillers or other additives being used in the manufacturing process as well as the parameters including temperatures, cycle time (for injection molding) and the like. Either before or after, one can then determine the physical properties 14 of the product under consideration. The physical properties to be determined may include, weight, tensile strength, flexible modulus, impact, tear strength and color. The physical properties of the resin may also be ascertained including the melt index, specific gravity, shape (chip, bead, cylindrical bead and/or density, and the like).

Once the product 10 and sufficient of the manufacturing 12 and physical properties 14 have been ascertained, the next step is to determine what improvements may be desired 16. For example, the user may wish to shorten cycle time, use less resin, maintain hardness while decreasing weight, increase foaming. In effect, the user may wish to accomplish any one or more of several improvements including to increase production rate (decrease cycle time), use less expensive material while maintaining cost and quality and to improve one or more physical properties.

Once a desired improvement is ascertained, then one selects one or more fly ash materials 18 that the operator has learned heuristically will produce the desired result or that will produce a result that is close to or approximates the desired result. That is, the user will have acquired or have access to an inventory of a plurality of fly ash materials that have cinders and have different particle size distribution. The user will have heuristically obtained an understanding of the fly ash composition such as the particle size distribution and the cinder content to effect the improvement desired. From experience the user will know that the result can be achieved or approximated using different fly ash compositions mixed together 20 and further mixed as necessary using other additives (e.g., titanium dioxide, calcium carbonate) 22 to form a blend 24. The experience of the user is such that the user will know that the blend when mixed 24 with some of the selected resin 26 as discussed hereinafter will form a master batch 28 that is later mixed with more resin 30 yield a desired production process change 32 or approximates the desired production process change and/or that attains or approximates the physical properties that are desired for the product formed 34. The master batch may be formed in a suitable way to be one of pellets, a powder or a liquid. Alternately, one may mix the one or more first fly ash materials with all the resin to form a compound that is used to manufacture the desired product. The compound may also be in the form of pellets, a powder or a liquid. It may also be possible to mix any two of the powder, pellets and liquid for specific applications.

Inasmuch as the process is heuristic, the formed product 34 is desirably tested 36 by standard laboratory tests. That is, one can perform tests for any desired property from color to hardness to flex modulus. Similarly, the process or manufacturing stop 32 is measured and monitored 38 so that cycle time, temperatures, flow rates and the like are suitably recorded. The data from the testing 36 and the measuring and monitoring 38 is then compared 40 to that which is desired and, in turn, has boon selected or projected.

If the results 38 of the process or manufacturing step attain or are close enough to that which is desired or projected and/or if the physical properties of the finished product attain or are close enough to the desired or projected results, the blend 24 can be fixed and extended production undertaken with the improved or better results. However, if the differences after comparison 40 are such that the user is able to project further or different results with changes to the fly ash materials in quantities and in particle size distribution, then the process can be repeated until the results following comparison 40 is acceptable.

What is claimed is:

1. A method of heuristically controlling the formation of and the properties of a composition, said method comprising:
   a. identifying a finished product formed from a composition;
   b. determining the manufacturing process for the said finished product, said manufacturing process having at least one measurable parameter;
   c. determining at least one physical property of said finished product;
   d. identifying the resin to be used to manufacture said finished product;
   e. identifying at least one desired improvement to one of said one measurable parameter of said manufacturing process and said physical property of said finished product;
   f. selecting a first quantity of first fly ash material for combining with said resin to produce said at least one desired improvement, said first fly ash material having magnetic particles removed therefrom and said first fly ash material having a desired particle size distribution selected heuristically;
   g. forming a first master batch using a portion of said resin and using said first fly ash material;
   h. mixing said first master batch with another portion of said resin to form a first composition;
   i. manufacturing a first finished product using said manufacturing process having said at least one measurable parameter and using said first composition;
   j. selectively measuring said at least one measurable parameter and testing said first finished product to determine said at least one physical property;
   k. comparing said at least one measurable parameter or said at least one physical property with said at least one desired improvement and determining a first difference therebetween;
   l. determining if the difference is acceptable or not acceptable;
   m. for a not-acceptable difference, heuristically selecting one of a second quantity of said first fly ash material and a third quantity of a second fly ash material, said second fly ash material having magnetic particles removed therefrom and said second fly ash material having a second desired particle size distribution selected heuristically which differs from the first particle size distribution;
   n. forming a second master batch with a portion of said resin and using one of said second quantity of said first fly ash material and a third quantity of said second fly ash material;
   o. mixing said second master batch with another portion of said resin to form a second composition;
   p. manufacturing a second finished product using said manufacturing process having said at least one measurable parameter and using said second composition;
   q. selectively measuring said at least one measurable parameter when making said second finished product and testing said second finished product to determine said at least one physical property;
   r. selectively comparing said at least one measurable parameter when making said second finished product and said at least one physical property of said second finished product with said at least one desired improvement and determining a second difference therebetween;
   s. evaluating said second difference to determine if the second difference is acceptable or not acceptable; and
   t. repeating steps m through s to form additional compositions and additional finished products and testing each additional composition to determine a new difference until the difference is acceptable.

2. The method of claim 1 wherein said master batch is formed into one of pellets, a powder and a liquid.

3. A method of heuristically forming a composition, said method comprising:
   a. identifying a finished product formed from a composition;
   b. determining the manufacturing process for the said finished product, said manufacturing process having at least one measurable parameter;
   c. determining at least one physical property of said finished product;
   d. identifying the resin to be used to manufacture said finished product;
   e. identifying at least one desired improvement to one of said one measurable parameter of said manufacturing process and said physical property of said finished product;
   f. heuristically selecting a fly ash material for combining with said resin to produce said at least one desired improvement, said fly ash material having less than 2% by weight of moisture;
   g. forming a first master batch using a portion of said resin and using said fly ash material;
   h. mixing said first master batch with another portion of said resin to form a first composition;
   i. manufacturing a first finished product using said manufacturing process having at least one measurable parameter and using said first composition;
   j. selectively measuring said at least one measurable parameter and testing said first finished product to determine said at least one physical property;
   k. comparing said at least one measurable parameter or said at least one physical property with said at least one desired improvement and determining a first difference therebetween;
   l. determining if said first difference is acceptable or not acceptable; and
   m. for a not-acceptable difference, repeating steps f through l (ell) using a second fly ash material having a particle size distribution which is the same as or different from said first fly ash material to form an additional composition and to form an additional finished product using said manufacturing process and selectively testing said additional finished product and measuring said at least one measurable parameter to determine said at least one physical property and comparing the at least one physical property with the desired improvement to determine a difference therebetween repeat steps f through l(ell) until the difference therebetween is acceptable.

4. The method of claim 3 wherein said master batch is formed into one of pellets, a powder and a liquid.

5. A method of heuristically controlling the formation of and the properties of a composition, said method comprising:
   a. identifying a finished product;
   b. determining the manufacturing process for the said finished product, said manufacturing process having at least one measurable parameter;
   c. determining at least one physical property of said finished product;

d. identifying the resin to be used to manufacture said finished product;
e. identifying at least one desired improvement to one of said one measurable parameter of said manufacturing process; and
f. heuristically selecting a fly ash material to produce said at least one desired improvement, said fly ash material having magnetic particles removed therefrom and said fly ash material having less than 2% by weight of moisture and a first particle size distribution;
g. forming at least one composition using said resin and using said fly ash material;
h. manufacturing a finished product using said manufacturing process having at least one measurable parameter and said composition;
i. selectively measuring said at least one measurable parameter and testing said finished product to determine said at least one physical property;
j. comparing said at least one measurable parameter and said at least one physical property with said at least one desired improvement and determining any difference;
k. determining if the difference is acceptable or not acceptable; and
l. for a not acceptable difference, repeating the above steps f through k using one of a different fly ash material having a second particle size distribution that is different from said first particle size distribution and a different resin until said difference is acceptable.

6. The method of claim 5 wherein said composition is formed into one of pellets, a powder and a liquid.

7. The method of claim 5 wherein said fly ash material is mixed with other selected materials to form a blend which is mixed with a portion of said resin to form said composition.

8. A method of heuristically controlling the properties of a composition, said method comprising:
a. identifying a finished product;
b. determining at least one physical property of said finished product;
c. identifying the resin to be used to manufacture said finished product;
d. identifying a desired improvement to said physical property of said finished product;
e. selecting a fly ash material to produce said desired improvement, said fly ash material being comprised of a first fly ash material and a second fly ash material different from said first fly ash material, said first fly ash material and said second fly ash material both being heuristically selected to have a different desired particle size distribution;
f. forming a compound using said resin and said fly ash material; and
g. manufacturing a finished product using said compound.

9. The method of claim 8 wherein said compound is formed into of one of a pellet, powder and a liquid.

10. The method of claim 3 wherein said one measurable parameter is one of rehology, viscosity, foaming and melt index or melt flow index.

11. The method of claim 3 wherein said physical property is one of tensile strength, flexible modulus, impact, tear strength and brittleness.

12. The method of claim 3 further including mixing additives into said first composition.

13. A method of heuristically forming a composition, said method comprising:
a. identifying a finished product formed from a composition;
b. determining the manufacturing process for the said finished product, said manufacturing process having at least one measurable parameter;
c. determining at least one physical property of said finished product;
d. identifying the resin to be used to manufacture said finished product;
e. identifying at least one desired improvement to one of said one measurable parameter of said manufacturing process and said physical property of said finished product;
f. heuristically selecting a fly ash material for combining with said resin to produce said at least one desired improvement;
g. forming a first master batch using a portion of said resin and using said fly ash material;
h. mixing said first master batch with another portion of said resin and with additives including calcium carbonate and titanium dioxide to form a first composition;
i. manufacturing a first finished product using said manufacturing process having at least one measurable parameter and using said first composition;
j. selectively measuring said at least one measurable parameter and testing said first finished product to determine said at least one physical property;
k. comparing said at least one measurable parameter or said at least one physical property with said at least one desired improvement and determining a first difference therebetween;
l. determining if said first difference is acceptable or not acceptable; and
m. for a not-acceptable difference, repeating steps f through l (ell) using a different quantify of said fly ash material to form additional compositions and to form additional finished products using said manufacturing process and selectively testing each additional finished product and measuring the manufacturing process to determine said at least one physical property and comparing the at least one physical property with the desired improvement to determine a difference therebetween and until the difference is acceptable.

14. The method of claim 13 wherein said fly ash material is comprised of a first fly ash material and a second fly ash material different from said first fly ash material, said first fly ash material and said second fly ash material both being heuristically selected.

15. The method of claim 13 wherein said one measurable parameter is one or more of rehology, viscosity, foaming and melt index or melt flow index.

16. The method of claim 13 wherein said at least one physical property is one or more of tensile strength, flexible modulus, impact, tear strength and brittleness.

17. The method of claim 13 further including mixing additives into said first composition.

18. A method of heuristically controlling the formation of and the properties of a composition, said method comprising:
a. identifying a finished product;
b. determining the manufacturing process for the said finished product, said manufacturing process having at least one measurable parameter,
c. determining at least one physical property of said finished product;
d. identifying the resin to be used to manufacture said finished product;

e. identifying at least one desired improvement to one of said one measurable parameter of said manufacturing process; and
f. heuristically selecting a fly ash material to produce said at least one desired improvement;
g. forming at least one composition using said resin and using said fly ash material plus additives including calcium carbonate and titanium dioxide;
h. manufacturing a finished product using said manufacturing process having at least one measurable parameter and said composition;
i. selectively measuring said at least one measurable parameter and testing said finished product to determine said at least one physical property,
j. comparing said at least one measurable parameter and said at least one physical property with said at least one desired improvement and determining any difference;
k. determining if the difference is acceptable or not acceptable; and
l. for a not acceptable difference, repeating the above steps e through k until said difference is acceptable.

19. The method of claim 18 wherein said fly ash material has magnetic particles which are removed therefrom.

* * * * *